United States Patent
Liu et al.

(10) Patent No.: US 11,123,169 B2
(45) Date of Patent: Sep. 21, 2021

(54) ELECTRIC TOOTHBRUSH FOR BRUSHING TEETH VERTICALLY

(71) Applicant: Dajocare Technology(Shenzhen) Co., Ltd, Shenzhen (CN)

(72) Inventors: Pingjun Liu, Shenzhen (CN); Yutao Liu, Shenzhen (CN)

( * ) Notice: Subject to any disclaimer, the term of this patent is extended or adjusted under 35 U.S.C. 154(b) by 0 days.

(21) Appl. No.: 17/242,264

(22) Filed: Apr. 27, 2021

(65) Prior Publication Data

US 2021/0244520 A1    Aug. 12, 2021

Related U.S. Application Data

(63) Continuation of application No. PCT/CN2019/091310, filed on Jun. 14, 2019.

(30) Foreign Application Priority Data

Dec. 17, 2018  (CN) .......................... 201811544481.7
Dec. 17, 2018  (CN) .......................... 201822117398.3

(51) Int. Cl.
*A61C 17/34* (2006.01)

(52) U.S. Cl.
CPC ...... *A61C 17/3409* (2013.01); *A61C 17/3418* (2013.01)

(58) Field of Classification Search
CPC ..... A61C 17/3409; A61C 17/34; A61C 17/32; A61C 17/3418; A61C 17/3445; A61C 17/3454; A61C 17/3463
USPC ....... 310/15, 12.14, 323.07, 323.14; 15/22.1, 15/22.4, 22.2
See application file for complete search history.

(56) References Cited

U.S. PATENT DOCUMENTS 1,945,616 A * 2/1934 Mastrud ............. A61C 17/3472
                                                    601/142
3,379,906 A * 4/1968 Spohr .................... A61H 13/00
                                                    310/50

(Continued)

FOREIGN PATENT DOCUMENTS

CN   1528251 A    9/2004
CN   2836749 Y   11/2006

(Continued)

OTHER PUBLICATIONS

Nternation Search Report of PCT/CN2019/091310, dated Sep. 18, 2019.

*Primary Examiner* — Michael D Jennings
*Assistant Examiner* — Makena S Markman (57) ABSTRACT

An electric toothbrush for brushing teeth vertically is disclosed. Forward and backward swing of the brush head (9) is realize through a spatial transmission mechanism to simulate the vertical brush action process of real manual brush brushing. The transmission includes a normal cam (2), a main support (3), a slide block (4), a rolling ball (5), a slide block limiting cylinder (6), a reverse cam cylinder (7) and a transmission housing (8). The input end of the positive cam (2) is sleeved on the rotating shaft of the motor (1), and the output end of the reverse cam cylinder (7) is connected with the brush head (9) of the electric toothbrush. A groove (21) is arranged on the positive cam (2), and the positive cam (2) drives the reverse cam cylinder (7) through the cooperation of the slide block (4) and the ball (5).

4 Claims, 6 Drawing Sheets

(56) References Cited

U.S. PATENT DOCUMENTS

| | | | | |
|---|---|---|---|---|
| 3,661,018 A | * | 5/1972 | Keefer | A61C 17/3472 74/22 R |
| 5,448,792 A | * | 9/1995 | Wiedemann | A61C 17/34 15/22.1 |
| 5,465,444 A | * | 11/1995 | Bigler | A61C 17/40 15/22.1 |
| 9,468,511 B2 | * | 10/2016 | Garrigues | A61C 17/3418 |
| 10,555,797 B2 | | 2/2020 | Luo et al. | |
| 2004/0117929 A1 | | 6/2004 | Lin et al. | |
| 2017/0360539 A1 | | 12/2017 | Luo et al. | |

FOREIGN PATENT DOCUMENTS

| | | |
|---|---|---|
| CN | 206167093 U | 5/2017 |
| CN | 107174365 A | 9/2017 |
| JP | 05146314 A | 6/1993 |

* cited by examiner

ELECTRIC TOOTHBRUSH FOR BRUSHING TEETH VERTICALLY

CROSS-REFERENCE TO RELATED APPLICATIONS

This application is a continuation of International Patent Application No PCT/CN2019/091310 with a filing date of Jun. 14, 2019, designating the United States, and further claims priority to Chinese Patent Application No. 201811544481.7 with a filing date of Dec. 17, 2018, Chinese Patent Application No. 201822117398.3 with a filing date of Dec. 17, 2018. The content of the aforementioned applications, including any intervening amendments thereto, are incorporated herein by reference.

FIELD OF THE INVENTION

The invention relates to the field of electric toothbrushes, and more specifically, to an electric toothbrush for brushing teeth vertically along the direction of teeth gaps.

BACKGROUND OF THE INVENTION

In the current market, there are two kinds of electric toothbrushes, the first one is a mechanical rotating toothbrush on which a rotary bristle disc swings in the disc plane. These simple rotating transmission mechanisms mostly fall into the followings: a vibrating ball at the free end of a cantilever beam at high-speed rotation, a high-speed rotating cam, eccentric wheel or crank, to strike on the rotating disc. The rotating plane is parallel to the tooth surface, therefore it cannot clean the teeth gaps and teeth roots across the gums, and the tooth surface wears out seriously. The second is a vibrating type toothbrush, which includes mechanical eccentric wheel vibration and linear deflection excitation enhanced by electromagnet. The vibration is faded away exponentially cycle by cycle, and the bristle amplitude looks like large, however, the quality of the bristle is only the level of milligram, and the actual power output used for brushing teeth is very low, so the brushing effect is not ideal.

Technical Problem

It is a very difficult task to develop a vertically brushing electric toothbrush which is driven by oscillating rotary rod of toothbrush head. The most simple solution is to drive the rod to swing by a forward and reverse motor, considering that the motor has two time constants, i.e. mechanical time constant remarked as Tm, and an electrical time constant remarked as Te. Tm is much larger than Te. That means, the frequency of the small-angle forward-reverse motor will be very low, the torque output will be very small, and will work in the high-current conditions, especially the room inside the electric toothbrush for placing the motor is very limited.

SUMMARY OF THE INVENTION

The technical problem to be solved by the present disclosure is to provide an electric toothbrush brushing the teeth vertically along the direction of teeth gaps.

The technical scheme adopted by the present disclosure to solve the above technical problem is as follows:

An electric toothbrush including a brush head 9 and a housing 10 in which the motor 1 and reverse cam cylinder 7 acted as an output shaft 11 are mounted. The brush head 9 is fixed on the output shaft 11. A transmission 12 is provided between the output shaft 11 and the motor 1. The transmission 12 includes a normal cam 2, a main bracket 3, a slider 4, a ball 5, a slider-guiding cylinder 6, a reverse cam cylinder 7 and a transmission housing 8. The normal cam 2 is cylindrical, and the outer wall of the normal cam 2 is provided with a groove 21. The groove 21 is connected end-to-end around the normal cam 2. The ball 5 is arranged in the groove 21. The main bracket 3 is sleeved on the positive cam 2. The bottom end of the main bracket 3 is provided with a flange ring 30. The flange ring 30 is provided with a limiting hole 31, and the side wall of the main bracket 3 is provided with a slide block groove 32. A slider 4 is provided in the slide groove 32. An outer wall of the slider 4 is provided with a cylindrical pin 42. An inner wall of the slide 4 is provided with a curved groove 41, and the curved groove 41 is in contact with the ball 5. The sliding block limiting cylinder 6 is sleeved on the main support 3. The sliding block limiting cylinder 6 is fixedly connected with the main support 3, the sliding block limiting cylinder 6 is provided with a through groove 61 in a longitudinal direction, and the cylindrical pin 42 penetrates through the through groove 61. The reverse cam cylinder 7 is sleeved on the sliding block limiting cylinder 6, the side wall of the reverse cam cylinder 7 is provided with a sliding slot 72, the cylindrical pin 42 is located in the sliding slot 72, and the bottom end of the reverse cam cylinder 7 is provided with a limiting protrusion 71. The limiting protrusion 71 is located in the limiting hole 31 of the flange ring 30, and the transmission case 8 is sleeved on the reverse cam cylinder 7.

Preferably, the output shaft is integral with the reverse cam cylinder 7. The output shaft penetrates through the transmission housing 8.

Preferably, the bottom end of the slider limiting cylinder 6 is provided with mounting posts. Mounting holes are provided on the flange ring and the mounting posts are located in the mounting holes of the flange ring. The sliding block limiting cylinder 6 is fixedly connected to the main support 3 through the mounting posts, and the freedom of the sliding block limiting cylinder 6 is limited by the mounting posts.

Preferably, the slider 4 is fan-shaped. The fan-shaped structure is smaller in volume.

Beneficial Effects

In the electric toothbrush, the forward and backward swing of the brush head 9 is realize through a spatial transmission mechanism to simulate the vertical brush action process of real manual tooth brushing. The transmission includes a normal cam 2, a main support 3, a slide block 4, a ball 5, a slide block limiting cylinder 6, a reverse cam cylinder 7 and a transmission housing 8. The positive cam 2 is the input end of the transmission and sleeved on the rotating shaft of the motor 1. The output end of the reverse cam cylinder 7 is the variable and connected with the brush head 9 of the electric toothbrush, and the positive cam 2 is provided with a groove 21. In addition, the normal cam 2 drives the reverse cam cylinder 7 through the cooperation of the slide block 4 and the ball 5 to convert the one-way rotation of the motor shaft into the reciprocatingswing motion of the brush head 9. In the case of limited radial dimension, the fixed indexing of input and output rotation angle in the coaxial or axial parallel direction is realized by adding a transmission, output characteristics with unchanged frequency and increased torque multiple is realized.

BRIEF DESCRIPTION OF THE DRAWINGS

The present disclosure will now be described in detail with reference to the accompanying drawings in order to make the above-mentioned advantages of the present disclosure more clearer.

DETAILED DESCRIPTION OF THE INVENTION

Hereinafter, embodiments of the present disclosure will be described in detail with reference to the drawings and embodiments. Thus, technical means for solving technical problems and achieving technical effects can be fully understood and implemented. It should be noted that each embodiment of the present disclosure and each feature in each embodiment of the present disclosure may be combined with each other as long as there is no constitution conflict, and the formed technical solutions are within the scope of protection of the present disclosure.

As shown in FIGS. 1-9, An electric toothbrush including a brush head 9 and a housing 10 in which the motor 1 and an output shaft 11 are fixed. The output shaft 11 is connected to the brush head 9 through the housing 10. A transmission 12 is provided between the output shaft 11 and the motor 1. The transmission 12 includes a normal cam 2, a main bracket 3, a slider 4, a ball 5, a slider stop cylinder 6, a reverse cam cylinder 7 and a transmission housing 8. The normal cam 2 is cylindrical, and the outer wall of the normal cam 2 is provided with a groove 21. The groove 21 is connected end-to-end around the normal cam 2. The ball 5 is arranged in the groove 21. The main bracket 3 is sleeved on the positive cam 2. The bottom end of the main bracket 3 is provided with a flange ring 30. The flange ring 30 is provided with a limiting hole 31, and the side wall of the main bracket 3 is provided with a slide block groove 32. A slider 4 is provided in the slide groove 32. An outer wall of the slider 4 is provided with a cylindrical pin 42. An inner wall of the slide 4 is provided with a curved groove 41, and the curved groove 41 is in contact with the ball 5. The sliding block limiting cylinder 6 is sleeved on the main support 3. The sliding block limiting cylinder 6 is fixedly connected with the main support 3, the sliding block limiting cylinder 6 is provided with a through groove 61 in a longitudinal direction, and the cylindrical pin 42 penetrates through the through groove 61. The reverse cam cylinder 7 is sleeved on the sliding block limiting cylinder 6, the side wall of the reverse cam cylinder 7 is provided with a sliding slot 72, the cylindrical pin 42 is located in the sliding slot 72, and the bottom end of the reverse cam cylinder 7 is provided with a limiting protrusion 71. The limiting protrusion 71 is located in the limiting hole 31 of the flange ring 30, and the transmission case 8 is sleeved on the reverse cam cylinder 7.

Figure 1:
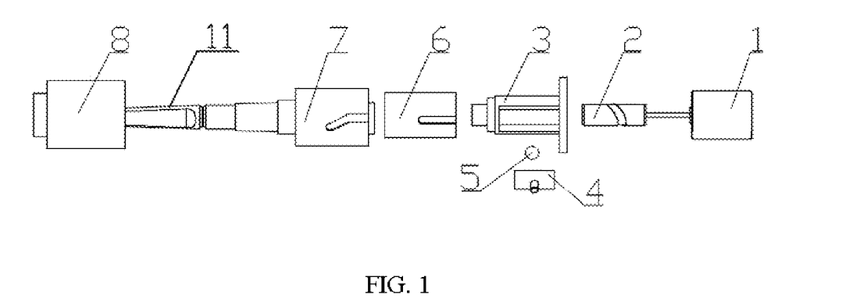
FIG. 1 is an exploded view of a transmission of an electric toothbrush for brushing teeth vertically of the present invention.
Figure 2:
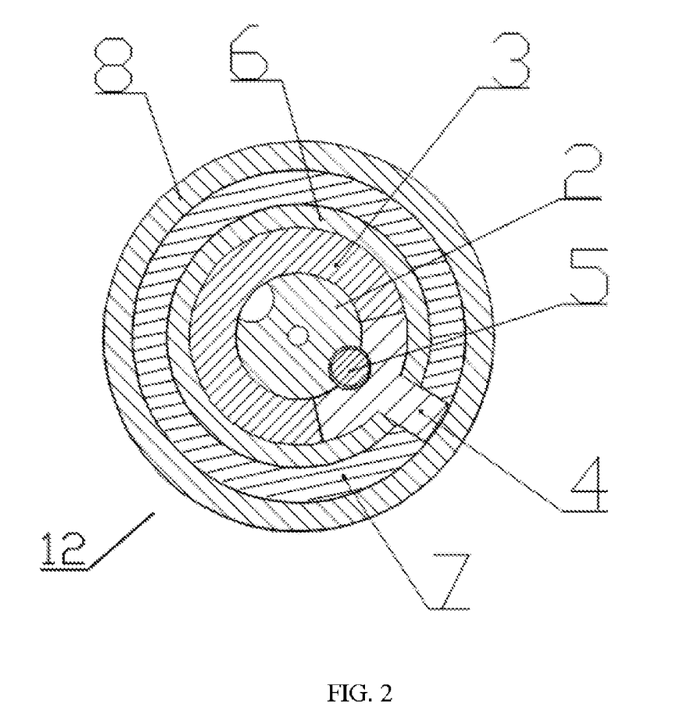
FIG. 2 is a cross-sectional view of a transmission for a vertical brush electric toothbrush according to the present invention.

Preferably, the output shaft 11 is integral with the reverse cam cylinder 7 and the output shaft 11 penetrates through the transmission housing 8.

Figure 6:
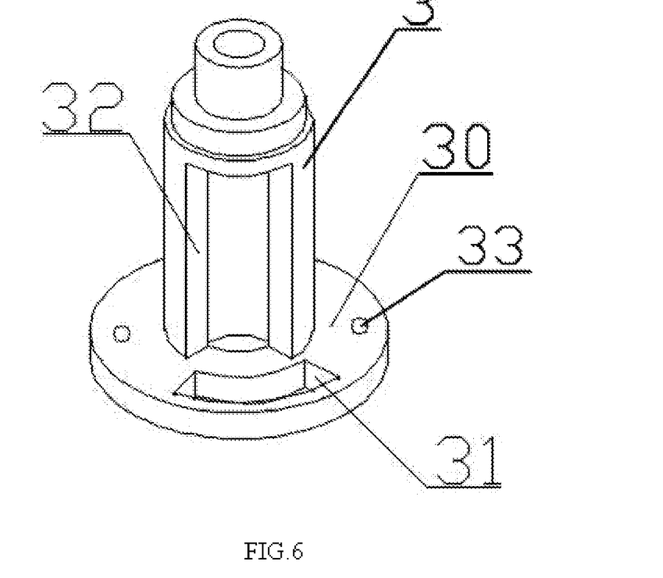
FIG. 6 is a schematic view of a main bracket of an electric toothbrush for brushing teeth vertically of the present invention.
Figure 7:
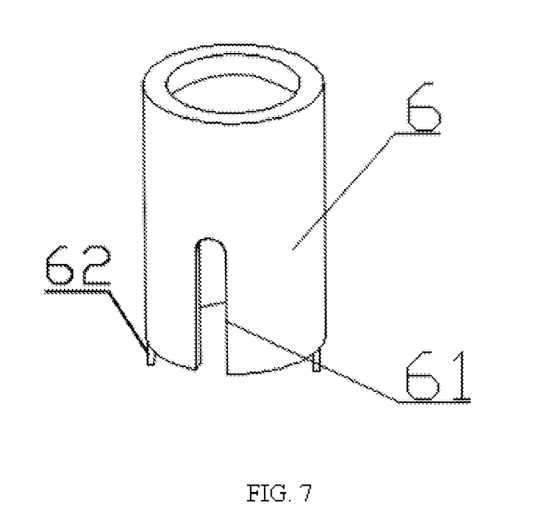
FIG. 7 is a schematic view of a slider limiting cylinder of an electric toothbrush for brushing teeth vertically of the present invention.
Figure 8:
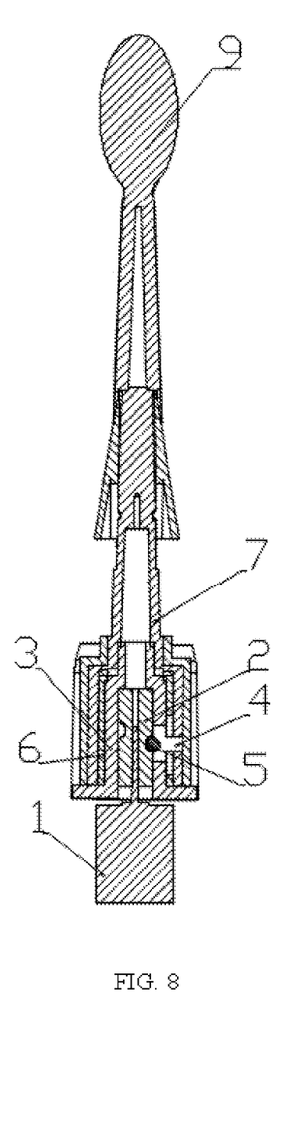
FIG. 8 is a half sectional view of an electric toothbrush for brushing teeth vertically of the present invention.
Figure 9:
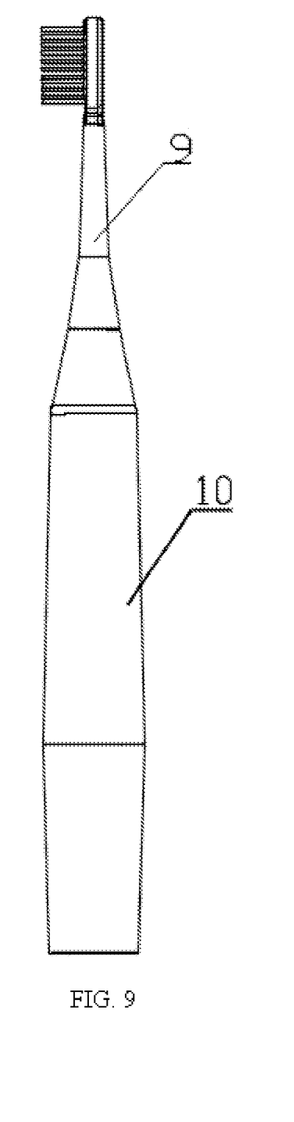
FIG. 9 is a structural diagram of an electric toothbrush for brushing teeth vertically of the present invention.

Preferably, the bottom end of the slider limiting cylinder 6 is provided with a mounting post 62. The flange ring 30 is provided with a mounting hole 33, and the mounting post 62 is located in the mounting hole 33 of the flange ring 30. The sliding block limiting cylinder 6 is fixedly connected to the main support 3 through a mounting post 62, and the freedom of the sliding block limiting cylinder 6 is limited by the mounting post 62.

Figure 5:
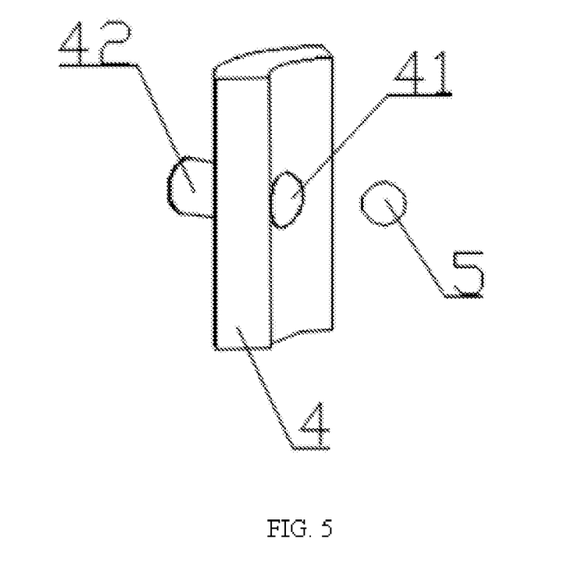
FIG. 5 is a schematic view of a slider of an electric toothbrush for brushing teeth vertically of the present invention.

Preferably, the slider 4 is sector-shaped. The fan-shaped structure is smaller in volume.

Figure 3:
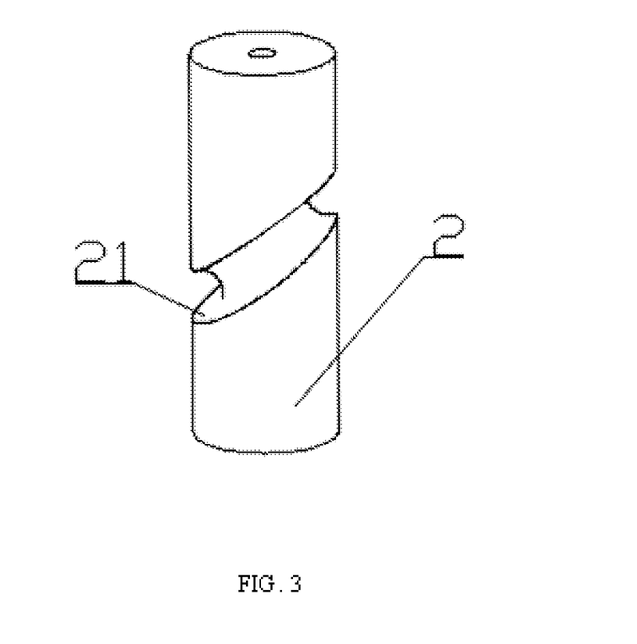
FIG. 3 is a schematic view of a positive cam of an electric toothbrush for brushing teeth vertically of the present invention.
Figure 4:
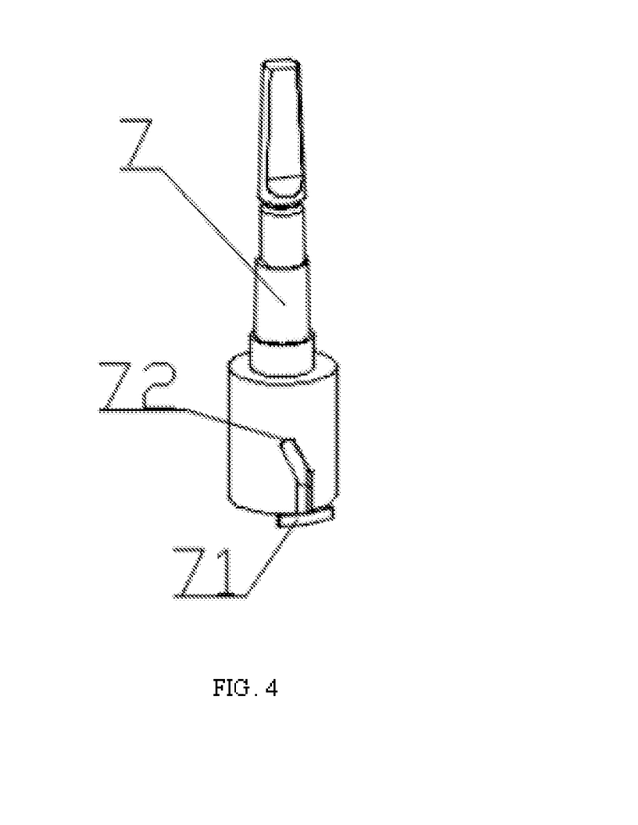
FIG. 4 is a schematic view of a reverse cam cylinder of an electric toothbrush for brushing teeth vertically of the present invention.

The axial displacement of the groove unit rotation angle of the positive cam is set as t, when t>0, it is indicated that the positive cam is in a lifting state, when t=0, it is indicated the annular groove has no lifting, and when t<0, it is indicated that the positive cam is in a returning state. Different combinations of rotational angle values and unit lift corresponding to the three cases result in different desired grooves 21. The maximum torque increase factor is obtained when the full 180 degree angle of rotation of the groove 21 is designed for a single lift or returning. If the rotation angle of the slide groove 72 of the reverse cam cylinder 7 is set to θ and the number of turns of the groove 21 of the reverse cam is k, the torque amplification factor m=k*180/θ and the output frequency is the input frequency divided by k. For example, if the rotation angle of the groove 72 of the single-ring groove positive cam and the reverse cam cylinder is set to 10-18 degrees, the maximum torque amplification factor is 18-10 times, and if the groove is multi-ring groove 21, the maximum torque amplification factor is multiplied by the number of turns k.

The transmission is a precise spatial transmission mechanism, the motor drives the positive cam 2 to rotate. The groove 21 on the positive cam 2 pushes the ball circularly in the groove 21, and the ball cooperates with the slider 4. Restricted by the through groove 61 of the slider limiting cylinder 6, the slider 4 linearly reciprocates. The cylindrical pin 42 of the slider 4 is located in the groove 72 of the reverse cam cylinder 7, and the cylindrical pin 42 drives the reverse cam cylinder 7 to swing and rotate. The brush head 9 is sleeved on the reverse cam cylinder to realize vertical brushing.

The groove 21 of the positive cam 2 is an integral multiple of 360 degrees corresponding to the circumferential angle of the central axis of the positive cam 2. One rotation of the positive cam 2 corresponds to one reciprocation of the slider 4. And so on, a multi-cycle loop. The groove 21 has a number of cycles produces a single discontinuous cross break point on the lift and return curves every 360 degrees, and under the action of friction and inertia, the ball 5 can pass through the cross break point smoothly. The curved groove 21 having no inflection point enables the normal cam 2 to operate stably.

A main support 3, a sliding block limiting cylinder 6, and a transmission housing 8 are assembled one after the other, fixing each other and connecting into one piece. The bracket portion is a key component for coupling the normal cam 2, the reverse cam cylinder 7 and the slider 4, and the strength of the reverse cam cylinder 7 is reinforced by the stopper projection 71 of the reverse cam cylinder 7. Through the cooperation between the limiting block 71 and the limiting hole 31, the swing range of the inverted block cylinder is restricted, the main support 3 is connected with the motor 1 at the input end, and auxiliary mechanisms such as snap fit can be added as required.

The slider 4 is engaged with a ball, and the normal cam 2 is coupled to the slider 4 via the ball. The slide 4 drives the reverse cam cylinder 7 by means of a cylindrical pin 42 on the slide 4. In that slide block 4, the fan-shape structure is adopted, the volume is the minimum. Other step positioning guide or other shapes may be adopted, and other rollers may be adopted for the ball. Other equivalent members such as a taper pin, a ball head pin, and a telescopic pin may be used as the cylindrical pin 42.

The reverse cam cylinder 7 is the output end of the transmission, on which the brush head 9 carries out vertically oscillating brushing. In the case of a functional transmission, the slot 72 of the reverse cam cylinder 7 can be designed at any fixed angle from 0 to 360 degrees. As the output end of the electric toothbrush, the angle of the chute 72 is 10-18 degrees, which meets the operating requirements. The sliding groove 72 of the reverse cam cylinder 7 is engaged by the cylindrical pin 42 of the sliding block 4, and the sliding groove 72 with a small angle of rotation used in the electric toothbrush can be directly opened at the inner and outer walls to simplify the machining process. The rigidity of the reverse cam cylinder 7 will not be greatly influenced.

In the disclosure, the power is provided by the conventional permanent magnet direct current rotary electric machine. The rotation speed of the electric machine is 3000-12000 rpm, the output torque of the electric machine is 6-18 g. cm. In that case of a single-turn groove 21, the oscillation frequency is equal to the output angular speed of the motor, and the brush head fixed at the output end reciprocates within any fixed design angular parameter range of 10-18 degree along with the output shaft. The oscillation frequency is about 3000-12000 times/min, the bristle swing arc length is 2.5-4.5 mm, the maximum torque increase is 10-18 times (18 times at 10 degrees and 10 times at 18 degrees). By changing the curve design of the positive cam groove 21, the torque multiplication factor can be reduced to achieve a torque output of approximately 50-160 g.

In this embodiment, the positive cam of the transmission is the driving part and the reverse cam cylinder is the driven part. According to an actual use, when the sliding groove 72 is in a 360-degree closed cycle, the reverse cam cylinder can be used as the driving part while the positive set cam acts as the driven part.

In the electric toothbrush for brushing teeth vertically, a transmission is additionally arranged between the motor 1 and the output shaft, so that the brush head 9 of the electric toothbrush can swing back and forth in the axial direction. In the disclosure, a circular curve groove 21 with no inflection point is arranged on the positive cam 2, so as to ensure the uniform speed rotation output of the motor 1, and in a limited space, the output torque is high. When the groove 21 is a single turn, the motor 1 rotates one turn, the brush head 9 swings for one cycle, and the brush head 9 swings at the same frequency as the rotational angular speed.

Embodiments of the Present Invention

Hereinafter, embodiments of the present disclosure will be described in detail with reference to the drawings and embodiments. Thus, technical means for solving technical problems and achieving technical effects can be fully understood and implemented. It should be noted that each embodiment of the present disclosure and each feature in each embodiment of the present disclosure may be combined with each other as long as there is no constitution conflict, and the formed technical solutions are within the scope of protection of the present disclosure.

As shown in FIGS. 1-9, An electric toothbrush including a brush head 9 and a housing 10 in which the motor 1 and an output shaft 11 are fixed. The output shaft 11 is connected to the brush head 9 through the housing 10. A transmission 12 is provided between the output shaft 11 and the motor 1. The transmission 12 includes a normal cam 2, a main bracket 3, a slider 4, a ball 5, a slider stop cylinder 6, a reverse cam cylinder 7 and a transmission housing 8. The normal cam 2 is cylindrical, and the outer wall of the normal cam 2 is provided with a groove 21. The groove 21 is connected end-to-end around the normal cam 2. The ball 5 is arranged in the groove 21. The main bracket 3 is sleeved on the positive cam 2. The bottom end of the main bracket 3 is provided with a flange ring 30. The flange ring 30 is provided with a limiting hole 31, and the side wall of the main bracket 3 is provided with a slide block groove 32. A slider 4 is provided in the slide groove 32. An outer wall of the slider 4 is provided with a cylindrical pin 42. An inner wall of the slide 4 is provided with a curved groove 41, and the curved groove 41 is in contact with the ball 5. The sliding block limiting cylinder 6 is sleeved on the main support 3. The sliding block limiting cylinder 6 is fixedly connected with the main support 3, the sliding block limiting cylinder 6 is provided with a through groove 61 in a longitudinal direction, and the cylindrical pin 42 penetrates through the through groove 61. The reverse cam cylinder 7 is sleeved on the sliding block limiting cylinder 6, the side wall of the reverse cam cylinder 7 is provided with a sliding slot 72, the cylindrical pin 42 is located in the sliding slot 72, and the bottom end of the reverse cam cylinder 7 is provided with a limiting protrusion 71. The limiting protrusion 71 is located in the limiting hole 31 of the flange ring 30, and the transmission case 8 is sleeved on the reverse cam cylinder 7.

Preferably, the output shaft 11 is integral with the reverse cam cylinder 7 and the output shaft 11 penetrates through the transmission housing 8.

Preferably, the bottom end of the slider limiting cylinder 6 is provided with a mounting post 62. The flange ring 30 is provided with a mounting hole 33, and the mounting post 62 is located in the mounting hole 33 of the flange ring 30. The sliding block limiting cylinder 6 is fixedly connected to the main support 3 through a mounting post 62, and the freedom of the sliding block limiting cylinder 6 is limited by the mounting post 62.

Preferably, the slider 4 is sector-shaped. The fan-shaped structure is smaller in volume.

The axial displacement of the groove unit rotation angle of the positive cam is set as t, when t>0, it is indicated that the positive cam is in a lifting state, when t=0, it is indicated the annular groove has no lifting, and when t<0, it is indicated that the positive cam is in a returning state. Different combinations of rotational angle values and unit lift corresponding to the three cases result in different desired grooves 21. The maximum torque increase factor is obtained when the full 180 degree angle of rotation of the groove 21 is designed for a single lift or returning. If the rotation angle of the slide groove 72 of the reverse cam cylinder 7 is set to θ and the number of turns of the groove 21 of the reverse cam is k, the torque amplification factor $m = k*180/\theta$ and the output frequency is the input frequency divided by k. For example, if the rotation angle of the groove 72 of the single-ring groove positive cam and the reverse cam cylinder is set to 10-18 degrees, the maximum torque amplification factor is 18-10 times, and if the groove is multi-ring groove 21, the maximum torque amplification factor is multiplied by the number of turns k.

The transmission is a precise spatial transmission mechanism, the motor drives the positive cam 2 to rotate. The groove 21 on the positive cam 2 pushes the ball circularly in the groove 21, and the ball cooperates with the slider 4. Restricted by the through groove 61 of the slider limiting cylinder 6, the slider 4 linearly reciprocates. The cylindrical pin 42 of the slider 4 is located in the groove 72 of the reverse cam cylinder 7, and the cylindrical pin 42 drives the reverse cam cylinder 7 to swing and rotate. The brush head 9 is sleeved on the reverse cam cylinder to realize vertical brushing.

The groove 21 of the positive cam 2 is an integral multiple of 360 degrees corresponding to the circumferential angle of the central axis of the positive cam 2. One rotation of the positive cam 2 corresponds to one reciprocation of the slider 4. And so on, a multi-cycle loop. The groove 21 has a number of cycles produces a single discontinuous cross break point on the lift and return curves every 360 degrees, and under the action of friction and inertia, the ball 5 can pass through the cross break point smoothly. The curved groove 21 having no inflection point enables the normal cam 2 to operate stably.

A main support 3, a sliding block limiting cylinder 6, and a transmission housing 8 are assembled one after the other, fixing each other and connecting into one piece. The bracket portion is a key component for coupling the normal cam 2, the reverse cam cylinder 7 and the slider 4, and the strength of the reverse cam cylinder 7 is reinforced by the stopper projection 71 of the reverse cam cylinder 7. Through the cooperation between the limiting block 71 and the limiting hole 31, the swing range of the inverted block cylinder is restricted, the main support 3 is connected with the motor 1 at the input end, and auxiliary mechanisms such as snap fit can be added as required.

The slider 4 is engaged with a ball, and the normal cam 2 is coupled to the slider 4 via the ball. The slide 4 drives the reverse cam cylinder 7 by means of a cylindrical pin 42 on the slide 4. In that slide block 4, the fan-shape structure is adopted, the volume is the minimum. Other step positioning guide or other shapes may be adopted, and other rollers may be adopted for the ball. Other equivalent members such as a taper pin, a ball head pin, and a telescopic pin may be used as the cylindrical pin 42.

The reverse cam cylinder 7 is the output end of the transmission, on which the brush head 9 carries out vertically oscillating brushing. In the case of a functional transmission, the slot 72 of the reverse cam cylinder 7 can be designed at any fixed angle from 0 to 360 degrees. As the output end of the electric toothbrush, the angle of the chute 72 is 10-18 degrees, which meets the operating requirements. The sliding groove 72 of the reverse cam cylinder 7 is engaged by the cylindrical pin 42 of the sliding block 4, and the sliding groove 72 with a small angle of rotation used in the electric toothbrush can be directly opened at the inner and outer walls to simplify the machining process. The rigidity of the reverse cam cylinder 7 will not be greatly influenced.

In the disclosure, the power is provided by the conventional permanent magnet direct current rotary motor. The rotation speed of the electric machine is 3000-12000 rpm, the output torque of the motor is 6-18 g·cm. In that case of a single-turn groove 21, the oscillation frequency is equal to the output angular speed of the motor, and the brush head fixed at the output end reciprocates within any fixed design angular parameter range of 10-18 degree along with the output shaft. The oscillation frequency is about 3000-12000 times/min, the bristle swing arc length is 2.5-4.5 mm, the maximum torque increase is 10-18 times (18 times at 10 degrees and 10 times at 18 degrees). By changing the curve design of the positive cam groove 21, the torque multiplication factor can be reduced to achieve a torque output of approximately 50-160 g·cm.

In this embodiment, the positive cam of the transmission is the driving part and the reverse cam cylinder is the driven part. According to an actual use, when the sliding groove 72 is in a 360-degree closed cycle, the reverse cam cylinder can be used as the driving part while the positive set cam acts as the driven part.

In the electric toothbrush for brushing teeth vertically, a transmission is additionally arranged between the motor 1 and the output shaft, so that the brush head 9 of the electric toothbrush can swing back and forth in the axial direction. In the disclosure, a circular curve groove 21 with no inflection point is arranged on the positive cam 2, so as to ensure the uniform speed rotation output of the motor 1, and in a limited space, the output torque is high. When the groove 21 is a single turn, the motor 1 rotates one turn, the brush head 9 swings for one cycle, and the brush head 9 swings at the same frequency as the rotational angular speed.

In the electric toothbrush, the forward and backward swing of the brush head 9 is realize through a spatial transmission mechanism to simulate the vertical brush action process of real manual tooth brushing. The transmission includes a normal cam 2, a main support 3, a slide block 4, a ball 5, a slide block limiting cylinder 6, a reverse cam cylinder 7 and a transmission housing 8. The positive cam 2 is the input end of the transmission and sleeved on the rotating shaft of the motor 1. The output end of the reverse cam cylinder 7 is the variable and connected with the brush head 9 of the electric toothbrush, and the positive cam 2 is provided with a groove 21. In addition, the normal cam 2 drives the reverse cam cylinder 7 through the cooperation of the slide block 4 and the ball 5 to convert the one-way rotation of the motor shaft into the reciprocating swing motion of the brush head 9. In the case of limited radial dimension, the fixed indexing of input and output rotation angle in the coaxial or axial parallel direction is realized by adding a transmission, output characteristics with unchanged frequency and increased torque multiple is realized.

Finally, it should be noted that the foregoing is only a preferred embodiment of the present disclosure and is not intended to limit the present disclosure, although the present disclosure has been described in detail with reference to the foregoing embodiments, for those skilled in the art, the technical solutions described in the foregoing embodiments can still be modified, or some of the technical features thereof can be equally replaced. Any modification, equivalent replacement, improvement, etc. made within the spirit and principle of the present invention should be included in the scope of protection of the present disclosure.

We claim:

1. An electric toothbrush for brushing teeth vertically comprising:
   a brush head and a housing for fixing a motor and an output shaft;
   the output shaft is connected to the brush head through the housing;
   a transmission is provided between the output shaft and the motor;
   wherein the transmission comprises:
      a normal cam, a main bracket, a slider, a ball, a sliding block limiting cylinder, a reverse cam cylinder and a transmission housing;
      the normal cam is cylindrical, and an outer wall of the normal cam is provided with a groove;
      the groove is connected end-to-end around the normal cam;
      the ball is provided in the groove;
      the main bracket is sleeved on the normal cam;
      a bottom end of the main bracket is provided with a flange ring;
      the flange ring is provided with a limiting hole, and a side wall of the main bracket is provided with a slide block groove;
      the slider is provided in the slide block groove;
      an outer wall of the slider is provided with a cylindrical pin;
      an inner wall of the slider is provided with a curved groove, and the curved groove is in contact with the ball;
      the sliding block limiting cylinder is sleeved on the main bracket;
      the sliding block limiting cylinder is fixedly connected with main bracket;
      the sliding block limiting cylinder is provided with a through groove in a longitudinal direction, and the cylindrical pin penetrates through the through groove;
      the reverse cam cylinder is sleeved on the sliding block limiting cylinder;
      the side wall of the reverse cam cylinder is provided with a sliding slot;
      the cylindrical pin is located in the sliding slot and the bottom end of the reverse cam cylinder is provided with a limiting protrusion;
      the limiting protrusion is located in the limiting hole of the flange ring; and
      the transmission housing is sleeved on the reverse cam cylinder.

2. The electric toothbrush for brushing teeth vertically of claim 1, wherein
   the output shaft is integral with the reverse cam cylinder; and
   the output shaft penetrates through the transmission housing.

3. The electric toothbrush for brushing teeth vertically of claim 1, wherein
   mounting posts are provided at a bottom end of the slider; and
   mounting holes are provided on the flange ring; and
   the mounting posts are provided within the mounting holes of the flange ring.

4. The electric toothbrush for brushing teeth vertically of claim 1, wherein the slider is fan-shaped.

* * * * *